United States Patent [19]

Koenig et al.

[11] 4,180,204
[45] Dec. 25, 1979

[54] AUTOMATIC INVENTORYING SYSTEM

[75] Inventors: Richard W. Koenig, Menomonee Falls; Philip R. Girard, Shorewood; Alfred J. Neuhauser, Wales, all of Wis.

[73] Assignee: The J. C. Penney Corporation, Inc., New York, N.Y.

[21] Appl. No.: 958,879

[22] Filed: Nov. 8, 1978

[51] Int. Cl.$^2$ .................... G06F 15/84; G06K 7/12; G06K 19/06

[52] U.S. Cl. .................................. 235/385; 235/454; 235/472; 235/487; 340/146.3 SY

[58] Field of Search ............... 235/454, 462, 472, 385; 250/555, 566, 569

[56] References Cited

U.S. PATENT DOCUMENTS

| | | | |
|---|---|---|---|
| 3,170,139 | 1/1962 | Robinow | 340/146.3 |
| 3,408,458 | 10/1968 | Hennis | 178/15 |
| 3,444,517 | 5/1969 | Rabinow | 340/146.3 |
| 3,947,817 | 3/1976 | Regua | 340/146.3 MA |
| 3,949,195 | 4/1976 | Wefers et al. | 235/472 |
| 3,991,299 | 11/1976 | Chadima, Jr. et al. | 235/472 |
| 4,028,537 | 6/1977 | Snow | 235/472 |
| 4,068,212 | 1/1978 | Templeton | 340/146.3 ED |

OTHER PUBLICATIONS

*Effects of Exposures of Dylux ® Photosensitive Materials*, R. Dessauer, E. Abramson, E. I. DuPont de Nemours and Co., Inc. pp. 1-12.
*Read/Write Stylus*, E. Uberbacher, IBM Tech. Disc. Bull., vol. 19, No. 1, Jun. 1976, pp. 1,2.
*Non Contact Bar Code Tag Printer*, D. W. Davenport, J. A. Dickerson, IBM Tech. Disc. Bul., vol. 17, No. 6, Nov. 1974, pp. 1,2.

*Primary Examiner*—Daryl W. Cook

[57] ABSTRACT

A method and means for automatically inventorying items having coded tags or labels using a character-recognition device, such as a wand scanner, in combination with a system for specially marking the labels when they have been successfully read and recorded by the scanner, which system comprises the use of a photosensitive dye-forming material on the label and an ultraviolet light-producing flash device on the scanner. The flash device is actuated upon the successful completion of a recognition reading and irradiates the label with ultraviolet light which produces a visible and permanent mark on the label.

22 Claims, 3 Drawing Figures

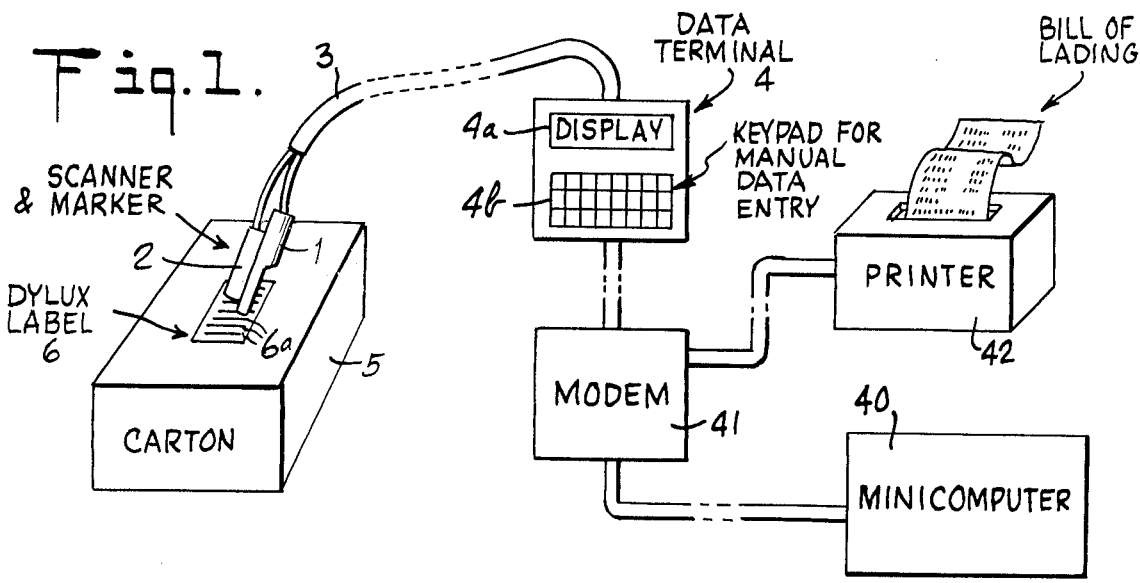
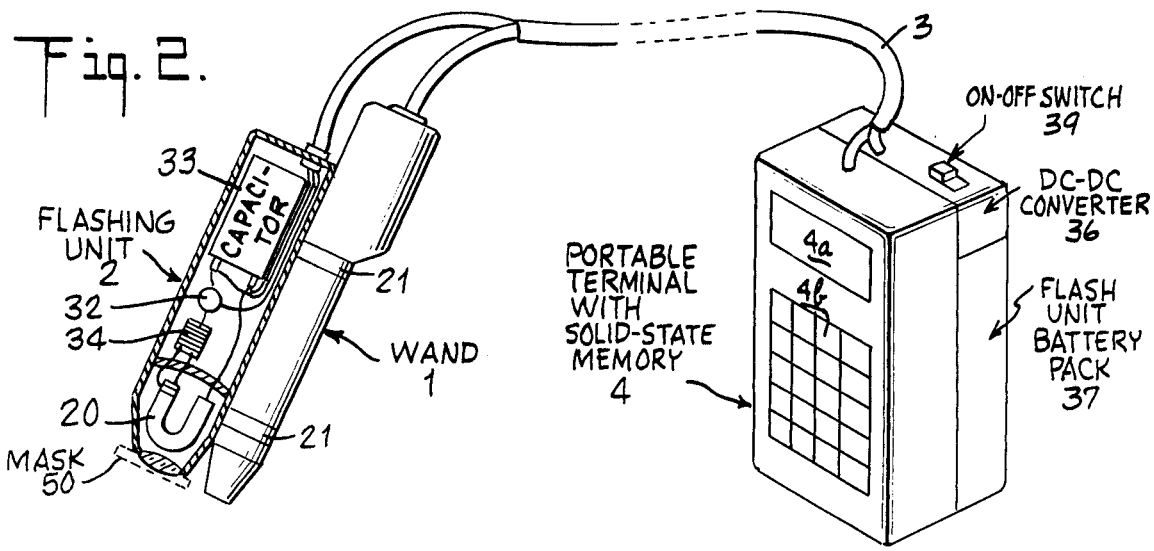
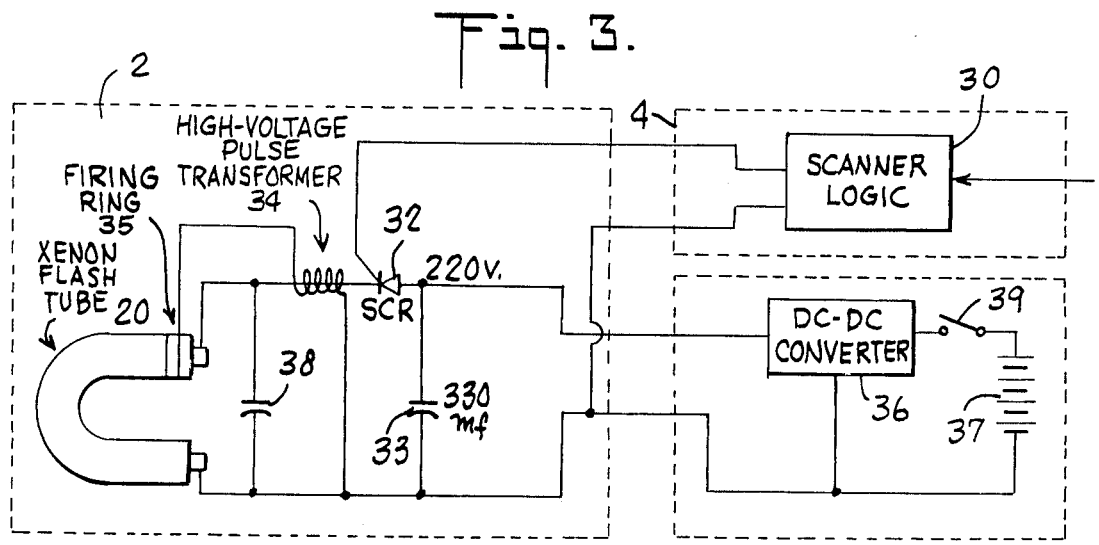

4,180,204

AUTOMATIC INVENTORYING SYSTEM

BACKGROUND OF THE INVENTION

The present invention relates to the electronic inventorying art and more particularly to a method and means for electronically reading graphic information on tags or labels and automatically marking the tags or labels with a permanent confirmatory mark upon successful completion of the reading operation.

The use of graphic markings, such as the UPC bar code, which can be automatically read by electronic character recognition systems, is well known in connection with identifying and recording documents and for inventorying stock and other merchandising operations. For these purposes, document scanners have been developed, such as shown in U.S. Pat. Nos. 3,170,139, 3,408,458 and 4,068,212, wherein movement and registration between the scanning system and a coded document are closely controlled, and wand scanners have been developed for use in situations where flexibility of movement is needed between the recognition system and the material to be read. In the latter regard, typical hand-held wand scanners are shown in U.S. Pat. Nos. 3,947,817 and 3,949,195 which are suitable for use, for example, in reading coded labels or tags on various sized packages and shipping cartons. Since, unlike the document scanner operation, proper reading of the codes are not assured with each scan of the wand, wand scanners have provisions for indicating whether or not a successful scan has been completed. Also, unlike the document scanners which use mechanical marking means that are operated in response to document reading, the freely manipulatible wand scanners have no associated marking means to confirm successful reading and inventorying. Clearly, attempts to adapt the document scanner marking means for use with wand scanners would considerably limit the flexibility of movement between the scanner and the labeled or tagged merchandise for which purpose the wand scanners were developed.

The present invention is directed to providing a marking system that may be used in all types of inventory control operations, whether manual or electronic, but which is particularly adaptable for use with wand scanners of the type described and which will not limit the required flexibility and relative movement between the scanner and the labeled cartons being read.

SUMMARY OF THE INVENTION

The present invention involves a method and means for specially marking coded merchandise, labels, tags or the like to indicate an inventory operation has been performed thereon, and particularly embodies the adaptation of a character recognition wand scanner to include a system which automatically marks the labels or the like when they have been successfully read by the scanner. The marking system comprises the use of a photosensitive dye-forming material, such as DYLUX (a registered trademark of E. I. DuPont De Nemours & Co., Inc.), on the label and an ultraviolet light producing flash device on the scanner. The flash device is actuated upon the successful completion of a recognition reading and irradiates the label with ultraviolet light to produce a visible and permanent indication or "postmark" by developing a dye in the photosensitive material confirming the successful reading. In addition, flash actuation provides immediate and unmistakable visual confirmation to the operator that the scan was successful irrespective of the postmark, and despite high ambient noise levels which might mask the typical audible verification. This marking system obviates the need for any manual or mechanical marking procedure which would limit the flexibility of the wand scanner operation and yet produces a positive, prompt, and permanent confirmatory mark on the label indicating the successful completion of the inventorying step. If it is desired to incorporate specific information in the marking beyond a simple confirmatory mark, this may be readily accomplished by suitable masking of the flash device which in view of its rapid operation will properly postmark the label subsequent to a successful scan.

In addition, the wand scanner and marking system combination may be combined with a suitable computer and printer to eliminate error and omission while significantly reducing the manipulation and time necessary in the preparation of associated documents such as shipment bills of lading.

BRIEF DESCRIPTION OF THE DRAWINGS

FIG. 1 is a diagrammatic view of a wand scanner and marking system in accordance with the present invention in combination with suitable components for preparing shipment bills of lading.

FIG. 2 is a perspective view with portions broken away illustrating a wand scanner which has been adapted to accommodate a flash device for use in the marking system of the present invention.

FIG. 3 is a schematic diagram of the combination of electrical components used in operating the flash device of the marking system.

DETAILED DESCRIPTION OF THE INVENTION

A wand scanner and marking system in accordance with the present invention is shown in FIG. 1 in combination with suitable components for preparing shipment bills of lading. As seen in the figure, a hand-held scan wand 1 and a flash unit 2 mounted thereon, are both connected by suitable electrical cable 3 to a conventional wand scanner data terminal 4. A carton 5 to be inventoried is provided with a label 6, a portion or all of which is coated with photosensitive dye-forming material, such as DYLUX, and which has appropriate graphical markings 6a thereon such as a UPC bar code. Suitable labels or tags for this purpose may consist of code printed paper having the photosensitive dye-forming material imprinted thereon. Alternatively, the markings and photosensitive dye-forming chemical coating may be applied directly to the surface of a carton or package or any other item or object to be inventoried and marked, as will be more fully understood from the description of a specific chemical of this sort, namely DYLUX, set forth more fully below.

The components of the wand scanner and flash device are shown in greater detail in FIG. 2. The wand scanner may be of a conventional type, such as obtainable from MSI Data Corporation of Santa Ana, California, and several other manufacturers. The scanner includes the scan wand 1 and the portable data terminal 4 which contains a solid state memory and has an appropriate display 4a and data entry key pad 4b on its face. The flash device 2 may be attached to the scan wand 1 by means of clips 21, or the wand and flash unit electronics may be incorporated into a single housing. The control electronics for operating the flash device may be attached to or incorporated into the portable data terminal housing, as shown in FIG. 2.

The flash device 2 includes a Xenon flash tube 20 and associated electronics that may consist essentially of the same components as used in the typical photographic flashgun. More particularly, the electronic components and circuitry for operating the flash device 2 are shown in detail in FIG. 3. The portable data terminal 4 contains conventional electronic circuitry 30 which upon receiving bar code data from the infrared scan wand verifies proper bar code tolerances, parity and check digit value and when a successful reading is completed, stores the decoded data in the self-contained memory and generates an appropriate signal to indicate a valid read. In adapting such a conventional wand scanner to the present invention, wires may be connected as shown in FIG. 3, from the terminal electronics 30 to an SCR solid state switch 32 in the flash device electronics. When scan data verification is complete, an electronic signal of sufficient amplitude to fire the SCR is generated, and the flash unit main capacitor 33 (typically about 330 microfarads), which is charged to in excess of 200 volts D.C., is connected across the Xenon flash tube 20. The flash tube 20 initially presents an open circuit. However, an impulse of current flows through the primary winding of a small high-voltage pulse transformer 34, by virtue of the charging of a shunt capacitor 38, generating a very high voltage spike. This high voltage spike is applied to the flash tube firing ring 35, ionizing the gas in the flash tube 20. The large capacitor 33 then discharges through the tube 20 causing a bright flash. The SCR 32 will turn off automatically when the capacitor 33 is discharged. The capacitor 33 will then be recharged by a D.C. to D.C. converter circuit 36 most conveniently located in the data terminal housing that increases the output of a self-contained low-voltage battery supply 37 to in excess of 200 volts. An on-off switch 39 is provided for disconnecting the power source.

While the scanning and marking system combination of the present invention will have wide application in processes where it is desired to have visible verification of the fact that a required operation has been performed, one particular preferred application is shown in FIG. 1. The system illustrated may be used for automatically creating shipment bills of lading and will obviate the presently commonly employed destubbing and manual data entry process. In operation, with the illustrated system the combined scanner and flash device (1,2) is passed over the coding 6a on the surface of label 6 until a successful reading is achieved. Upon the completion of a successful scan the flash device 2 is actuated and the accumulated label data is transmitted directly to a suitable computer 40 through a standard EIA modem interface 41. A conventional minicomputer may be used satisfactorily in the system. The minicomputer 40 can then be used to transmit a signal to a printer 42 to print up appropriate shipment bills of lading. The use of the scanner system in this manner eliminates error and omission while significantly reducing the lapsed time for preparation of the bill of lading. In addition to providing an accurate record of the coded information, the system can be enhanced to verify the shipment by comparing scanned data to data stored in the memory in the portable scanner data terminal 4.

Meanwhile, the firing of the flash device 2 produces a highly visible "postmark" adjacent the printed code bars 6a on the paper label 6. This is accomplished by coating the label 6 with a photosensitive dye-forming chemical such as DYLUX, which will be "developed" by virtue of irradiation with ultraviolet light generated by the Xenon flash. More particularly, DYLUX is an instant photoimaging material, produced by and obtainable from the DuPont Company, and covered by a number of patents including U.S. Pat. Nos. 3,390,996, and 3,445,234. This material contains a dye which is activated by ultraviolet light of approximately 320 nanometers wavelength. The dye consists primarily of a leuco dye which develops color when oxidized by certain chemical substances, that is, radicals which are selectively activated by ultraviolet light of sufficient intensity by a process called photolysis. The action of these radicals is the significant feature of DYLUX, and it should be understood that the intensity and not duration of the irradiating light is the important parameter. Different dyes may be employed to produce different colors upon development, but the blue dye is preferred as it is the most sensitive and intense for a given exposure to ultraviolet light. The commercially obtainable DYLUX material presently contains another photosensitive chemical which upon exposure to visible light in the range of 440-500 nanometers wavelength, that is, in the visible blue to green range, acts to combine with the radicals produced by the ultraviolet light to prevent color development. As a result, DYLUX will desensitize itself upon extended exposure to moderate intensity visible light containing both ultraviolet and blue-green colors such as sunlight or fluorescent light. Subsequent exposure to ultraviolet light will not result in color formation. It is therefore presently preferred that the DYLUX material not be subjected to extended exposure to moderate intensity ultraviolet light prior to performing an inventorying operation on the item with which it is associated.

If it is desired to incorporate specific information onto the photosensitive material beyond a simple confirmatory mark, this may be readily accomplished by mounting an appropriate mask 50 (FIG. 2) on the flash unit 2. The information, such as a date or further bar code, may be formed in the mask 50 so as to be incorporated into the pattern of the irradiating ultraviolet light and the dye in the photosensitive chemical coating will be developed accordingly. In view of the rapid operation of the flash device in response to the completion of a successful scan, proper orientation of the mark on the label will be facilitated by virtue of the limits of the wand orientation required for a successful scan. Also, the flash provides an immediate and positive indication to an operator that the reading and marking operation has been successfully completed.

It will be seen that an improved method and means for automatically inventorying items having coded tags or labels using a character recognition wand scanner has been disclosed which is combined with a system for specially marking the labels when they have been successfully read by the scanner. The improved system comprises the use of a photosensitive dye-forming material on the label and an ultraviolet light producing device on the scanner whereby upon the successful completion of a recognition reading the flash device is actuated to irradiate the label with ultraviolet light, thus producing a visible and permanent mark on the label by developing a dye in the photosensitive material. It will become apparent to those skilled in the art upon considering the foregoing description that the disclosed method and means may be varied within the scope of the invention to have wide application in procedures where visible verification that a required operation has been performed is desired. It is contemplated that other non-impact marking combinations of radiating energy and sensitive materials may be used, such as heat, even from a flash unit, which would alter a heat-sensitive chemical, or an ultrasonic beam which would fracture encapsulated ink to produce the visible and permanent indication.

We claim:

1. A method for providing a visible verification of the performance of an inventory operation on an item comprising the steps of:

disposing on the surface of an item to be inventoried information relating to said item in combination with a photosensitive material which undergoes a visible change upon being irradiated with appropriate light;

performing an inventory operation on said item by recording the information relating to said item; and upon the completion of the recordation of said information, producing a visible change in the photosensitive material by irradiating said material with said appropriate light to verify the performance of the recording step on the item.

2. Method as in claim 1 wherein said photosensitive material is a free-radical dye-forming system.

3. Method as in claim 2 wherein the appropriate light is produced with a Xenon flash tube.

4. Method as in claim 1 wherein said recording step is performed with a wand scanner.

5. Method as in claim 1 wherein said information is printed on a paper having said photosensitive material on the surface thereof.

6. Method as in claim 5 wherein said paper comprises a label.

7. Method as in claim 1 wherein said photosensitive material is DYLUX.

8. A system for providing a visible verification of the performance of an inventorying operation on an item comprising in combination:

means on the surface of said item for marking said item comprising:

means for providing information relating to said item; and photosensitive means for changing visibly upon being irradiated with appropriate light; means for recording said information in an inventorying operation;

means, responsive to the completion of the recordation of said information by said recording means, for irradiating said photosensitive means with said appropriate light to visibly change said photosensitive means thus verifying the performance of the inventorying operation.

9. The system of claim 8 wherein said photosensitive means comprises a free-radical dye-forming system.

10. The system of claim 9 wherein said irradiating means comprises a Xenon flash tube.

11. The system of claim 8 wherein said recording means comprises a wand scanner.

12. The system of claim 11 wherein said irradiating means is mounted on said wand scanner.

13. The system of claim 8 wherein said information means comprises a printed paper and said photosensitive means is coated or imprinted thereon.

14. A system for automatically producing a record for an item in combination with a visible verification on the item of the production of the record comprising:

label means for marking an item to be recorded, said label means comprising:

means for containing information relating to said item; and photosensitive dye-forming material;

means for recording from said label means said information relating to said item;

means for producing a signal upon the completion of the recording of said information by said recording means;

means responsive to said signal for irradiating said photosensitive dye-forming material with ultraviolet light to change the color thereof whereby a visible verification appears on said label means of the completion of the recording operation;

computer means for receiving said recorded information and producing an output signal in accordance therewith; and printer means responsive to the output signals of said computer means for printing out a record of said information.

15. The system of claim 14 wherein said recording means comprises a wand scanner.

16. The system of claim 15 wherein said irradiating means is mounted on said wand scanner.

17. The system of claim 16 wherein said irradiating means comprises a Xenon flash tube.

18. The system of claim 14 wherein said label means comprises a shipping label and said printed record comprises a bill of lading.

19. The system of claim 15 wherein said computer means comprises a minicomputer and a modem interface.

20. The system of claim 15 wherein said signal producing means comprises a minicomputer.

21. A method for providing a visible verification of the performance of an inventory operation on an item comprising the steps of:

disposing on the surface of an item to be inventoried information relating to said item in combination with a radiating energy sensitive material which changes visibly upon being irradiated with appropriate radiating energy;

performing an inventory operation on said item by recording the information relating to said item; and upon the completion of the recordation of said information, producing a visible change in the radiating energy sensitive material by irradiating said material with said appropriate radiating energy to verify the performance of the recording step on the item.

22. A system for providing a visible verification of the performance of an inventorying operation on an item comprising in combination:

means on the surface of said item for marking said item comprising:

means for providing information relating to said item; and radiating energy sensitive means for changing visibly upon being exposed to appropriate radiating energy;

means for recording said information in an inventorying operation;

means, responsive to the completion of the recordation of said information by said recording means, for exposing said radiating energy sensitive means to said appropriate radiation energy to visibly change said radiating energy sensitive means thus verifying the performance of the inventorying operation.

* * * * *